US008923620B2

(12) United States Patent
Sung

(10) Patent No.: US 8,923,620 B2
(45) Date of Patent: Dec. 30, 2014

(54) BROADCAST RECEIVING APPARATUS AND METHOD FOR PROVIDING MULTILATERAL VIDEO COMMUNICATION INCLUDING USER IMAGE

(75) Inventor: Young-hun Sung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1795 days.

(21) Appl. No.: 11/346,230

(22) Filed: Feb. 3, 2006

(65) Prior Publication Data

US 2006/0179451 A1 Aug. 10, 2006

(30) Foreign Application Priority Data

Feb. 5, 2005 (KR) .................. 10-2005-0010980

(51) Int. Cl.
| | | |
|---|---|---|
| G06K 9/46 | (2006.01) |
| H04N 7/14 | (2006.01) |
| H04N 21/422 | (2011.01) |
| H04N 21/4223 | (2011.01) |
| H04N 21/442 | (2011.01) |
| H04N 21/4788 | (2011.01) |
| H04H 60/80 | (2008.01) |

(52) U.S. Cl.
CPC ............... *H04N 7/147* (2013.01); *H04N 7/142* (2013.01); *H04N 21/42203* (2013.01); *H04N 21/4223* (2013.01); *H04N 21/44218* (2013.01); *H04N 21/4788* (2013.01); *H04H 60/80* (2013.01)
USPC ........................................................ 382/190

(58) Field of Classification Search
None
See application file for complete search history.

(56) References Cited

U.S. PATENT DOCUMENTS

| 6,583,792 B1* | 6/2003 | Agnew .......................... 345/660 |
| 6,593,956 B1* | 7/2003 | Potts et al. ................. 348/14.09 |
| 7,298,412 B2* | 11/2007 | Sannoh et al. ................ 348/348 |
| 2002/0064287 A1* | 5/2002 | Kawamura et al. ............. 381/92 |
| 2003/0103647 A1* | 6/2003 | Rui et al. ....................... 382/103 |
| 2003/0142854 A1* | 7/2003 | Cho et al. ...................... 382/118 |

FOREIGN PATENT DOCUMENTS

| KR | 10-0195724 | 2/1999 |
| KR | 10-2000-0045552 | 7/2000 |
| KR | 2003-0045392 | 6/2003 |

OTHER PUBLICATIONS

Byun, Hyeran and Lee, Seong-Whan, "A Survey on Pattern Recognition Applications of Support Vector Machines", International Journal of Pattern Recognition and Artificial Intelligence, 2003, World Scientific Publishing Company, vol. 17, No. 3, pp. 459-486.*

* cited by examiner

*Primary Examiner* — Chan Park
*Assistant Examiner* — Elisa Rice
(74) *Attorney, Agent, or Firm* — NSIP Law

(57) ABSTRACT

A broadcast receiving apparatus and a method for providing a multilateral video communication which makes it possible to communicate with a plurality of remotely opposite parties using a digital TV having a camera therein and which is capable of supporting the Internet. The broadcast receiving apparatus includes a position determining unit for determining a position of a user by analyzing a voice signal received through a microphone array, a detection unit for detecting a face of the user in the determined position from an image received through a camera, and a transmission unit for transmitting the detected face of the user and the received voice signal.

18 Claims, 7 Drawing Sheets

BROADCAST RECEIVING APPARATUS AND METHOD FOR PROVIDING MULTILATERAL VIDEO COMMUNICATION INCLUDING USER IMAGE

CROSS-REFERENCE TO RELATED APPLICATION

This application claims priority from Korean Patent Application No. 10-2005-0010980 filed on Feb. 5, 2005 in the Korean Intellectual Property Office, the disclosure of which is incorporated herein by reference.

BACKGROUND OF THE INVENTION

1. Field of the Invention

The present invention relates to a broadcast receiving apparatus and a method for providing a multilateral video communication, and more particularly to a broadcast receiving apparatus and a method for providing a multilateral video communication which makes it possible to communicate with a plurality of remotely opposite parties using a digital TV having a camera therein and which is capable of supporting the Internet.

2. Description of Related Art

With the advancements in technologies, the development of means for communicating with remotely opposite parties has been making a continuous progress. Particularly, users can now communicate with opposite parties through portable phones, send text messages, and conduct video and voice communications with the opposite parties through the Internet.

Also, according to IMT-2000 technology and so on, a user can conduct video communication with a remotely opposite party while on the street.

Korean Unexamined Patent Publication No. 2000-0045552 discloses a digital broadcast receiver which displays the phone call status on the display screen of a digital broadcast receiver connected to a PSTN (Public Switched Telephone Network) when receiving a call, and thus possibly enables the user to receive the phone call. This digital broadcast receiver simply transfers voice in the same manner as the existing telephone system, but cannot perform multilateral communication when connected to the PSTN.

Additionally, although a conventional video communication system connected to a PC makes it possible to perform multilateral video, voice and text communications, it is required for the users to join and access a specified site and to be always in a standby state with respect to all incoming calls.

BRIEF SUMMARY

An aspect of the present invention enables a user to communicate with a plurality of remotely opposite parties using a digital TV having a camera therein and which is capable of supporting the Internet.

Another aspect of the present invention enables the tracking, detecting, and enlarging of the face of a user and to transmit the user's enlarged face image to opposite parties.

According to an aspect of the present invention, there is provided a broadcast receiving apparatus for providing a multilateral video communication which includes a position determining unit for determining the position of a user by analyzing a voice signal received through a microphone array, a detection unit for detecting the face of the user in the determined position from an image received through a camera, and a transmission unit for transmitting the detected face of the user and the received voice signal.

In another aspect of the present invention, there is provided a broadcast receiving method for providing a multilateral video communication, which includes determining the position of a user by analyzing a voice signal received through a microphone array, detecting the face of the user in the determined position from an image received through a camera, and transmitting the detected face of the user and the received voice signal.

In another aspect of the present invention, there is provided a method of communicating using a television having a camera and a microphone array and which supports Internet access, including: determining a location of a user by analyzing a user voice signal received through the microphone array; detecting a face of the user from an image received by the camera, the camera faced toward the location of the user; and transmitting the detected face and the received voice signal via the Internet.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
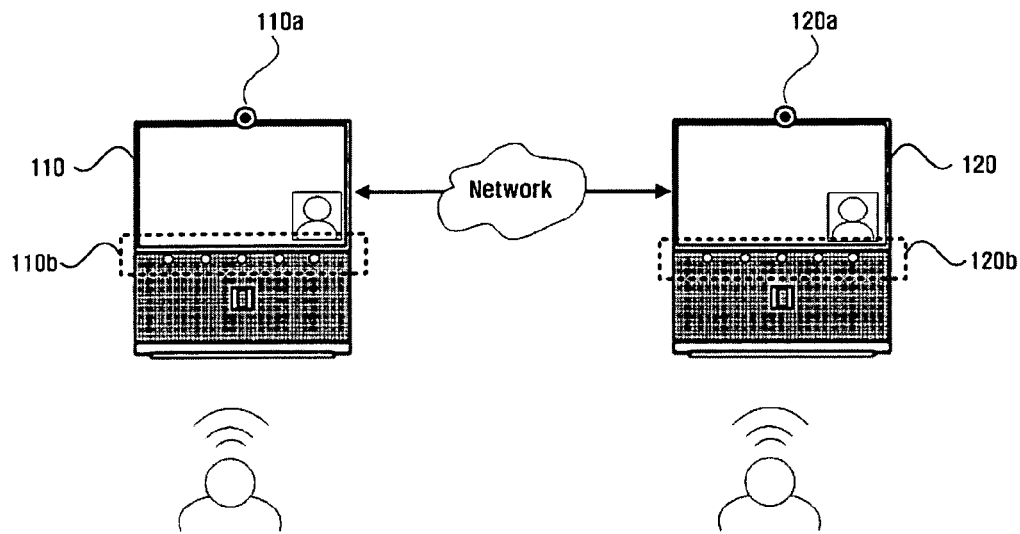
FIG. 1 is a view explaining video communication using a broadcast receiving apparatus for providing a multilateral video communication according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a view explaining video communication using a broadcast receiving apparatus for providing a multilateral video communication according to an embodiment of the present invention.

A first user, viewing a digital TV 110 which supports the Internet and which is provided with a camera, executes an application program built in the digital TV 110 in order to communicate with an opposite party. Accordingly, a list of stored opposite parties is displayed on a display screen of the digital TV by the execution of the video communication application program, and the first user can select a certain opposite party using an arrow key and so on of a remote controller.

The list of the opposite parties includes addresses of opposite parties, and if a certain opposite party (i.e., a second user) is selected, a phone call request message is transmitted to the address of the selected party.

The digital TV 120 of the second user having received the phone call request message displays the phone call request from the first user on the display screen and waits for the second user's reception of the phone call. If the second user confirms the reception of the phone call using a remote controller and so on, the digital TV 120 of the second user transmits a phone call response message to the digital TV 110 of the first user.

As the phone call request message and the phone call response message are exchanged between the first user and the second user, a network is formed between the digital TV 110 of the first user and the digital TV 120 of the second user, and image and voice signals are transmitted through the network.

In order to transmit the image signal to the opposite party, the digital TVs 110 and 120 may be provided with cameras 110a and 120a, respectively, which operate when the phone call request message or the phone call response message is transmitted.

In this case, the camera 110a or 120a may track, detect, enlarge and transmit the face of the user or the upper half of the body of the user. This is to protect the user's privacy. Additionally, according to the user's setting, the tracking and detection functions can be optionally implemented.

The digital TVs 110 and 120 according to the present embodiment are also provided with microphone arrays 110b and 120b, respectively. The microphone arrays 110b and 120b receive voice signals from the users, respectively. The position of the user can be briefly determined through the analysis of the received voice signals.

Accordingly, in addition to tracking and detecting the face of the user or the upper half of the body of the user in the determined position using the camera 110a or 120a and the microphone array 110b or 120b, the digital TV 110 or 120 according to the present embodiment can also remove voice signals coming in other directions around the determined position and amplify the voice signal coming from the user's position only.

Since the user who views the digital TV 110 or 120 generally puts the remote controller near at hand, a microphone may be installed in the remote controller so that the voice signal from the microphone may be transferred to the digital TV 110 or 120 through a wireless communication such as an infrared communication, wireless Internet, Bluetooth, and so on. The voice signal transferred to the digital TV 110 or 120 is subjected to noise removing and amplifying processes, and then is transmitted to the digital TV 120 or 110 of the opposite party.

Accordingly, a signal receiver array (not illustrated) for receiving an output signal of the remote controller may be installed in the digital TV 110 or 120 instead of the microphone array 110b or 120b. Using this signal receiver array, the position of the user can be instantaneously confirmed by the voice signal transmitted from the remote controller.

Figure 2:
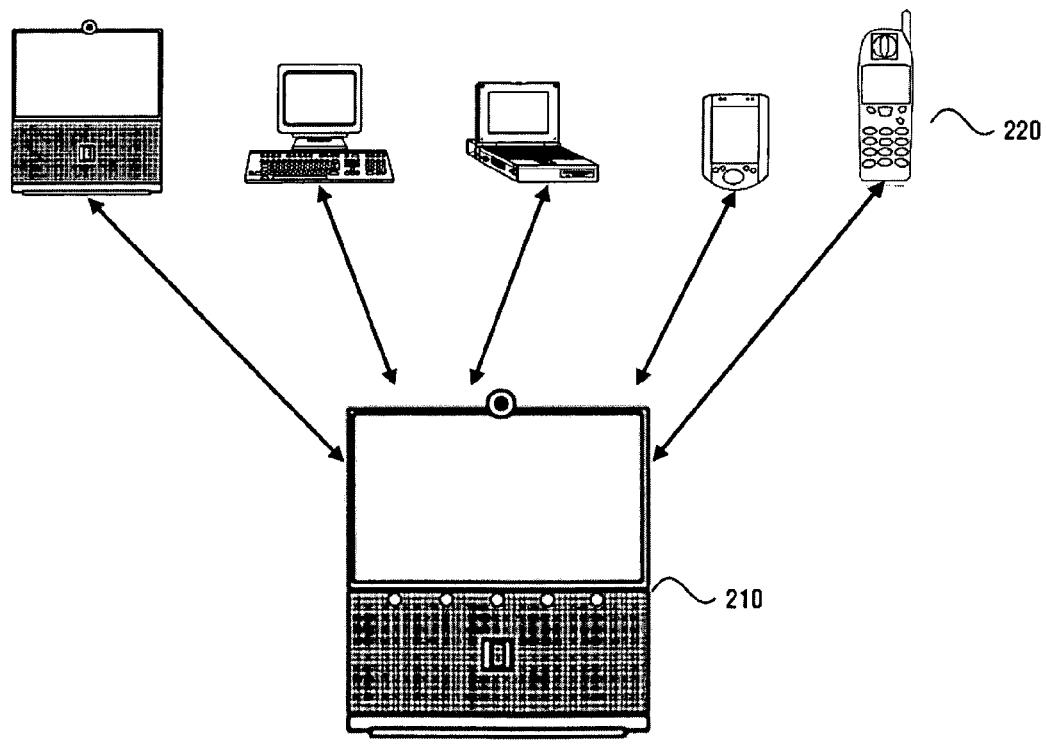
FIG. 2 is a view explaining video communication using a broadcast receiving apparatus for providing a multilateral video communication according to another embodiment of the present invention.

FIG. 2 is a view explaining video communication using a broadcast receiving apparatus for providing a multilateral video communication according to another embodiment of the present invention.

A broadcast receiving apparatus 210 that provides a multilateral video communication provides a selective video communication with a number of opposite parties. That is, if a user receives a phone call request message from a certain opposite party while he/she is conducting a video communication with another opposite party, the user may change the current video communication into a standby state to communicate with the party that sent the phone call request message. In this case, it is preferable that image and voice signals are not transmitted to a terminal 220 of the opposite party in the standby state.

Additionally, the user may simultaneously conduct a video communication with a number of opposite parties. In this case, the user may control the video communication with a number of opposite parties by selecting or removing specified opposite parties from the list of the opposite parties that is displayed on the display screen.

The opposite party's terminal 220 may include a fixed terminal such as a digital TV, a PC, and so on, and a mobile terminal such as a portable phone, a PDA, a laptop computer, and so on. It is preferable that the fixed terminal such as the digital TV, PC, and so on, exchanges image and voice signals through n Ethernet or IEEE 802.3 network, and the mobile terminal such as the PDA, laptop computer, and so on, exchanges image and voice signals through IEEE 802.11 wireless network.

In order to exchange the image and voice signals with a portable phone, a multimedia messaging service center (MMSC) may be used. MMSC is a system that stores and transmits large-capacity multimedia messages such as photographs, pictures, music files, and so on, in a mobile communication network. MMSC serves to store the multimedia messages provided from diverse types of systems such as portable phones, E-mail servers, web servers, and so on, and to relay the corresponding messages.

Figure 3:
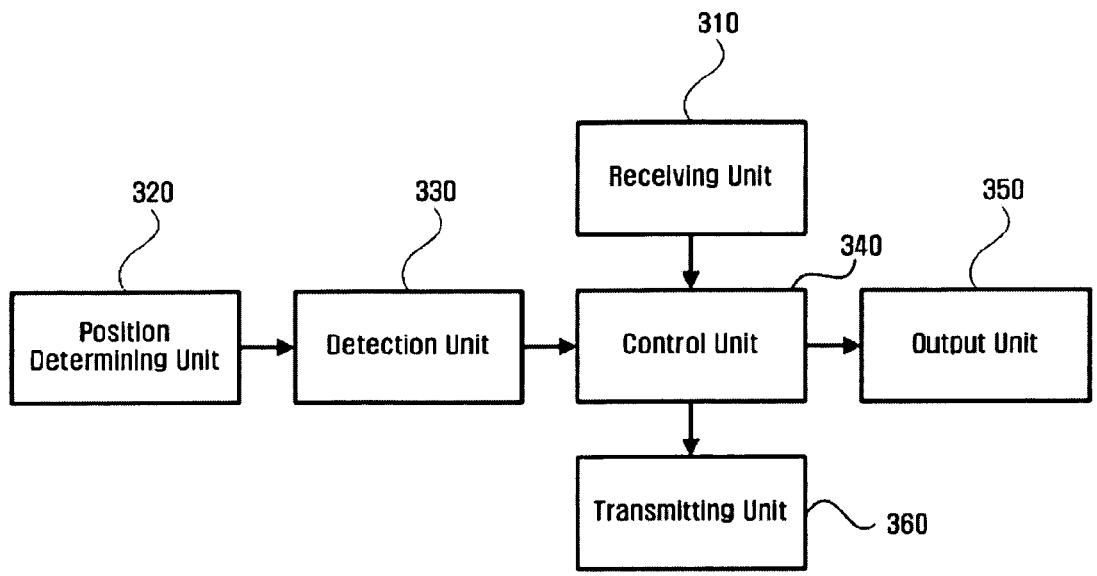
FIG. 3 is a block diagram illustrating the construction of a broadcast receiving apparatus for providing a multilateral video communication according to an embodiment of the present invention.

FIG. 3 is a block diagram illustrating the construction of a broadcast receiving apparatus for providing a multilateral video communication according to an embodiment of the present invention.

Referring to FIGS. 2 and 3, the broadcast receiving apparatus 210 that provides the multilateral video communication comprises a receiving unit 310, a position determining unit 320, a detection unit 330, a control unit 340, an output unit 350 and a transmitting unit 360.

The receiving unit 310 receives a phone call request from the opposite party's terminal 220. The phone call request message may include an address of the opposite party's terminal 220. Here, the opposite party's terminal 220 may be a digital TV, a PC, a laptop computer, a PDA, a portable phone, and so on. Since the opposite party's terminal 220 exchanges the image and voice signals using Ethernet or IEEE 802.3 protocol, the address of the opposite party's terminal 220 may be an IP address of the opposite party's terminal 220.

Additionally, the receiving unit 310 receives the image and voice signals from the opposite party's terminal 220.

The transmitting unit 360 transmits a response message to the phone call request message received from the opposite party's terminal 220. In this case, the transmitting unit 320 transmits the response message to the address of the opposite party's terminal 220 included in the phone call request message.

Additionally, the transmitting unit 360 transmits the image and voice signals received from a camera and a microphone array installed in the broadcast receiving apparatus.

A moving image format such as MPEG-1, MPEG-2, MPEG-4, wavelet, and so on, may be used as the data format of the image and voice signals received or transmitted, and accordingly, the apparatus 210 and the opposite party's terminal 220 may be provided with decoding means, respectively.

JPEG, i.e., motion JPEG (M-JPEG), which is least influenced by a network environment, may be used as the data format of the image and voice signals, and a compressed voice format such as G721, G723, G726, MP2, MP3, PCM, GSM, and so on, may be used as the voice format of the separately received or transmitted voice.

The position determining unit 320 briefly determines the position of the user by analyzing the voice signal received from the microphone array. Here, the microphone array is composed of a plurality of microphones each detecting receives the voice of the user. The received voice signal is analyzed by the position determining unit 320 to briefly determine the position of the user. In order to determine the position, a method using the time delay of voice detected by a respective microphone or the presence of the user in a position where the voice is generated may be used. In this case, by analyzing the frequency of the voice signal, even the moving state of the user can be determined.

In this case, in order to increase the efficiency of determining the position of the user, the position determining unit 320 may receive the voice signal having minimized noise only, and for this, a noise removing means is required.

According to a method of removing noise from input signals received through the microphone array, for example, input signals having mixed with voice and noise are multiplied by weight values, and the noise components are removed from an output signal that is obtained by adding all the input signals multiplied by the weight values. Here, it is important to determine the weight value that can minimize the noise of the output signal, and in the present invention, the weight value that can minimize the noise in a noise region is used as the weight value that can minimize the noise of the output signal.

The broadcast receiving apparatus 210 for providing a multilateral video communication may further comprise any noise removing unit (not illustrated) having a noise detection unit (not illustrated), a weight value determining unit (not illustrated) and a voice extraction unit (not illustrated).

The noise detection unit detects a noise region which does not have any voice signal from input signals received through the microphone array. The noise detection unit detects the noise region by determining whether an image signal exists in a region in which an average energy of the input signal is continuously increased.

The weight value determining unit determines the weight value used to extract the voice signal from signals existing in the noise region, and particularly determines the weight value that can minimize the noise in the noise region detected by the noise detection unit.

The voice extraction unit extracts only the voice signal from the input signals received through the microphone array using the weight value determined by the weight value determining unit.

The detection unit 330 detects the face of a user in a position determined by the position determining unit 320 from an image received through the camera. Here, the detection unit 330 may detect the face of the user or the upper half of the body of the user in order to protect the user's privacy. Here, functions of tracking and detecting the user's face or the upper half of the user's body may be provided in the camera. In other words, the detection unit 330 determines whether there is an image of the user image captured by the camera and if so, it enlarges the user's face or the upper half of the user's body to minimize the background behind the user.

Here, the camera may be provided with at least one of additional devices such as zooming, panning and tilting devices.

Additionally, the detection unit 330 may enlarge a digital image by a software application program in order to track and detect the face of the user, and the user can select either a method using the additional devices or a method using the application program depending on additionally provided devices.

The face tracking and detection, for example, is performed for each input image frame if the present detection mode is a face detection mode. If a face is not detected after performing the face detection several times, the present mode is changed to a motion detection mode to detect motion of the user. If the motion detection is performed several times, the present mode is changed to the face detection mode again. The above-described process is repeated, and if an end signal is received, the face tracking and detection process is concluded. The end signal may be optionally transmitted by the user through the remote controller and so on, or may be generated when the communication with the opposite party is ended.

In the present embodiment, the face detection is performed using a face database having reference face shapes. Specifically, a face area is detected by comparing an image frame input by a camera with the face database. In this case, M-grid Garbor wavelet transformation may be used as the image transformation method used to detect the face candidate area.

After the face candidate area is detected by M-grid Garbor wavelet transformation, more accurate face detection is performed by a support vector machine (SVM) classification technique.

The SVM classification technique, which includes low-resolution SVM-based face detection and high-resolution SVM-based face detection, is used to analyze the facial image that can be expressed as a relatively low-dimensional subspace. In this case, in order to reduce the dimension of the facial space, principal component analysis (PCA) may be used. PCA is a method of recognizing a face by extracting a primary feature vector, i.e., the principal component, of the face from the input image and comparing the extracted principal component vector with the principal component vector of the pre-trained and registered database image.

The user's face captured by the camera may differ according to the direction of the face, and this may severely restrict the detection of the user's face. Accordingly, in the present invention, reference images for front/side features and so on of human faces are prepared, and an edge image of the user's face captured by the camera is compared with the reference images, so that the user's face can be determined along his presence. In this case, the reference image and the edge image may be compared using Hausdorff distance.

Additionally, the user's face detected by the detection unit 330 may be finely adjusted by direction buttons of the remote controller. Accordingly, the broadcast receiving apparatus 210 that provides a multilateral video communication according to the present invention can accurately detect, enlarge and transmit the motion of the user to the opposite party's terminal 220.

The output means 350 outputs the image and voice signals of the user of the opposite party's terminal 220 received by the receiving unit 310 through a display unit and a speaker of the digital TV.

The control unit 340 controls the overall operation of the apparatus including the receiving unit 310, position determining unit 320, detection unit 330, output unit 350 and transmitting unit 360.

For reference, the broadcast receiving apparatus 210 which includes a digital TV and provides a multilateral video communication may receive the user's voice signal through a microphone provided in the remote controller. The remote controller receives the user's voice signal through the microphone provided therein and transmits the voice signal to the apparatus 210 using a wireless communication such as an infrared communication, Bluetooth, wireless Internet, and so on. The apparatus 210 having received the voice signal removes noise from the voice signal, amplifies and compresses the resulting voice signal, and then transmits the compressed voice signal to the opposite party's terminal 220 through the transmitting unit 360.

Here, a remote control signal receiver array (not illustrated) may be installed in the apparatus 210 instead of the microphone array, and the position determining unit 320 can determine the instantaneous position and motion of the user transmitting the voice signal using the remote control signal receiver array.

Additionally, the position determining unit 320 can also determine the distance between the user and the apparatus using the signal received through the microphone array or the remote control signal receiver array. In this case, the detection unit 330 may determine whether to enlarge or reduce the received image, and the apparatus 210 may adjust the size of the image or the volume of the voice signal received through the receiving unit 310.

Any broadcasting content received while voice communication is performed may be automatically recorded, and the recorded content and the broadcasting content may be simultaneously displayed using a screen division or picture-in-picture (PIP) technique after the voice communication is completed.

Figure 4:
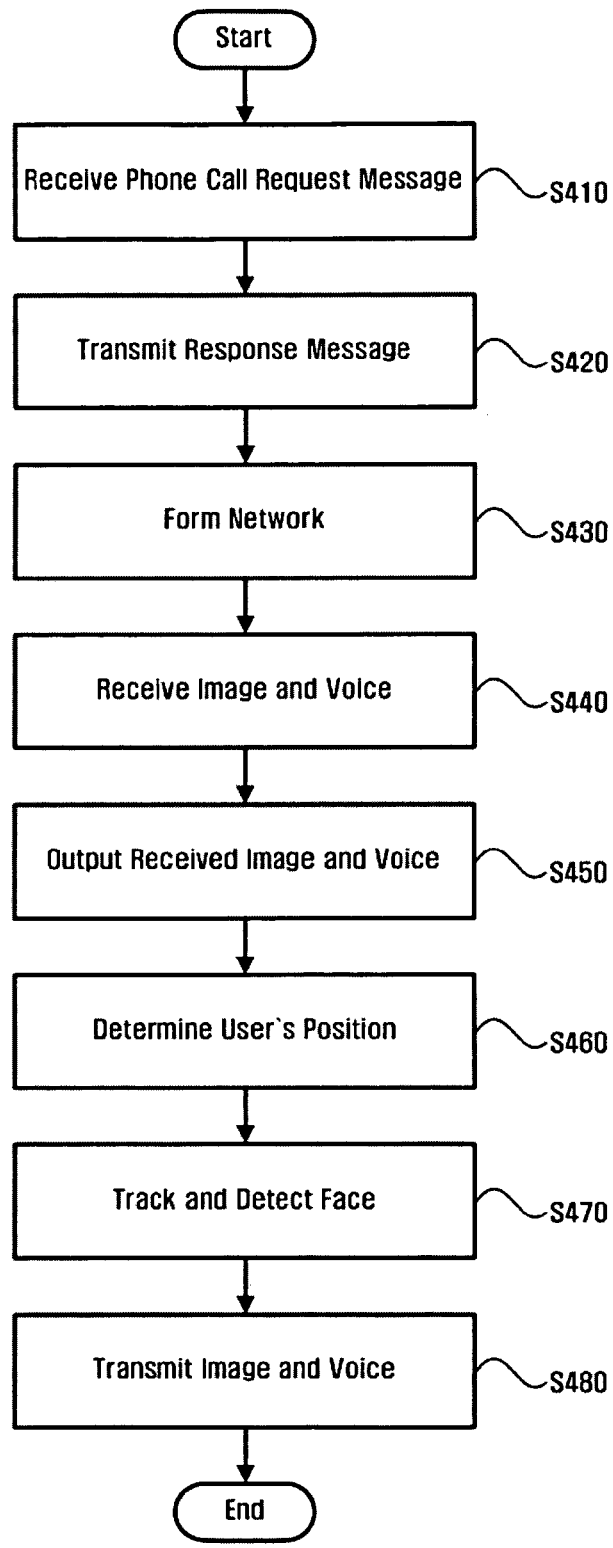
FIG. 4 is a flowchart illustrating a process of providing a multilateral video communication according to an embodiment of the present invention.

FIG. 4 is a flowchart illustrating a process of providing a multilateral video communication according to an embodiment of the present invention.

Referring to FIGS. 2 and 4, when the receiving unit 310 receives a phone call request message from the opposite party's terminal 220 (S410), the transmitting unit 360 transmits a corresponding response message (S420).

If a network is formed by the phone call request message and the response message (S430), the receiving unit 310 receives the image and voice signals from the opposite party 220 through the network (S440), and the received image and voice signals are output through the output unit 350 (S450).

If the response message is transmitted, the camera and the microphone array operate. The position determining unit 320 having analyzed the voice signal received the microphone array determines the user's brief position using the time delay of the voice signal and the presence of the user who has produced the voice signal (S460), and transfers the determined position to the detection unit 330. Accordingly, the detection unit 330 confirms whether the user exists in the image captured by the camera, and if so, it tracks and detects the face of the user or the upper half of the user's body (S470).

The detected face of the user may be finely adjusted by direction buttons of the remote controller.

The face tracking and detection operation (S470) using the camera may be performed in a manner that a face area is detected using M-grid Garbor wavelet transformation and then SVM classification technique is applied to the detected face candidate area to detect the face. This process will be explained with reference to FIG. 5.

In order to detect the user's face, the camera may be provided with at least one of additional devices such as zooming, panning and tilting devices, and a digital image enlargement that is performed by a software application program may be used in tracking and detecting the face.

The transmitting unit 360 transmits the user's face and voice detected as above to the opposite party's terminal 220 through the network (S480).

Figure 5:
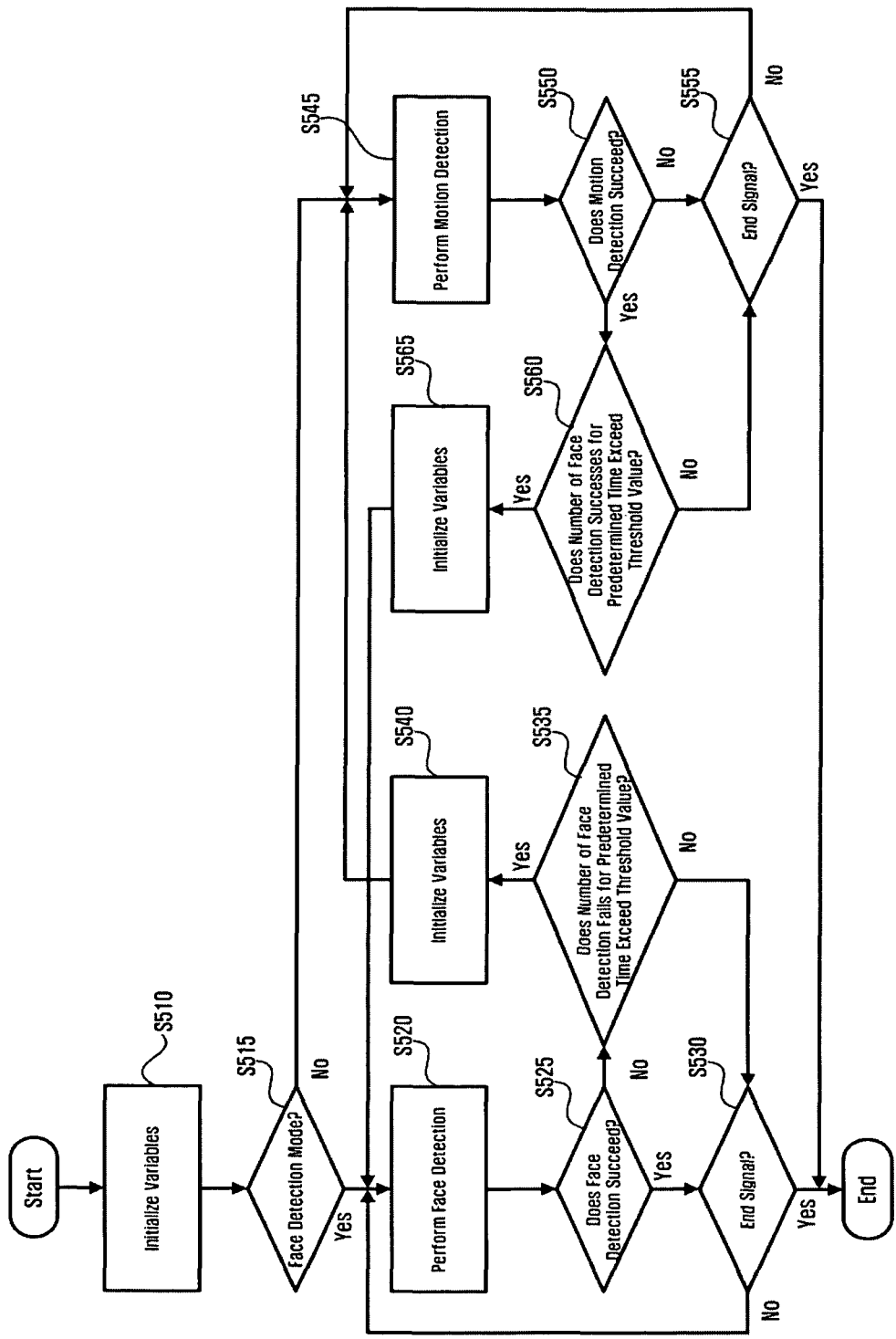
FIG. 5 is a flowchart illustrating a user detection process performed by a camera according to an embodiment of the present invention.

FIG. 5 is a flowchart illustrating a user detection process performed by a camera according to an embodiment of the present invention.

In order to perform the user detection using the camera, variables are first initialized S510. The initialized variables may include the number of face detection attempts, the number of motion detection attempts and the number of motion detection successes.

After the variable initialization operation (S510), it is determined whether the present mode is a face detection mode (S515). If the present mode is the face detection mode, the face detection is performed (S520), if not, a motion detection is performed (S545). In this case, the initial detection mode may be set to the face detection mode.

As described above, the face detection operation (S520) includes the facial region detection operation using M-grid Garbor wavelet transformation and the more accurate face detection operation using SVM classification technique.

Specifically, it is determined whether the face detection has succeeded by determining whether the face detected by SVM classification technique includes the facial area detected by M-grid Garbor wavelet transformation (S525). If the face detection has failed, it is determined whether the number of failures within a predetermined time exceeds a threshold value (S535). If the number of failures exceeds the threshold value, the face detection is stopped, the variables are initialized (S540), and then the motion detection is performed (S545).

If the face detection has succeeded, it is determined whether an end signal is received (S530) to decide whether to re-perform the face detection (S520).

If the motion detection is performed (S545), it is determined whether the motion detection has succeeded (S550). If the motion detection has succeeded, it is determined whether the number of successes within the predetermined time exceeds the threshold value S560. If the number of successes exceeds to the threshold value, the motion detection is stopped, the variables are initialized (S565), and then the face detection is performed (S520).

By contrast, if the motion detection has failed, it is determined whether an end signal is received (S555) to decide whether to re-perform the motion detection (S545).

Figure 6:
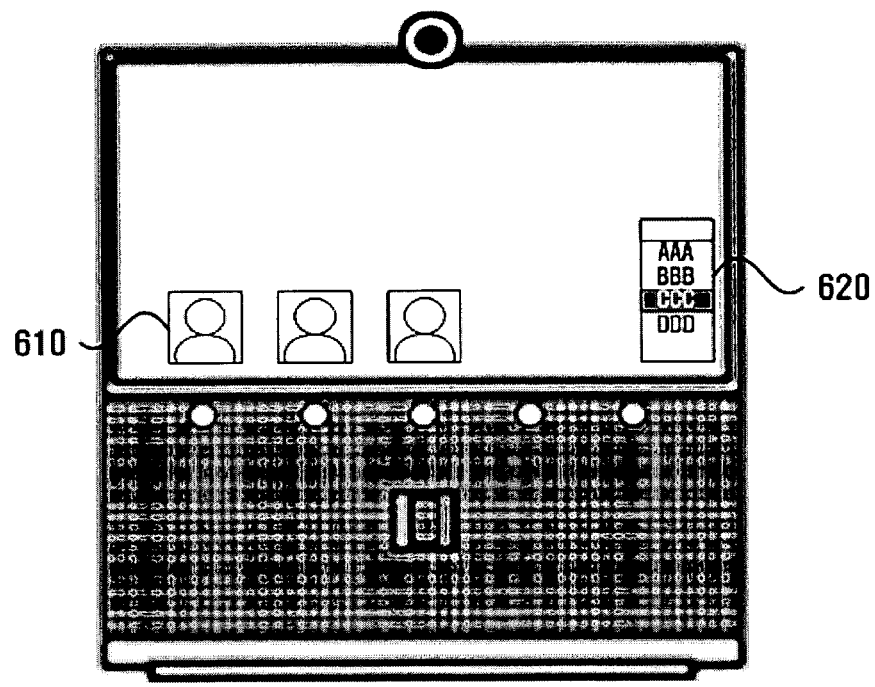
FIG. 6 is a view illustrating an example of an image displayed on a broadcast receiving apparatus for providing a multilateral video communication according to an embodiment of the present invention.

FIG. 6 is a view illustrating an example of a displayed picture of a broadcast receiving apparatus for providing a multilateral video communication according to an embodiment of the present invention.

Referring to FIGS. 2 and 6, the broadcast receiving apparatus 210 for providing a multilateral video communication provides an opposite-party list window 620 and opposite party image windows 610.

In the opposite-party list window 620, the names of opposite parties or the addresses of terminals may be displayed, which may be input in advance by the user. The opposite-party list window may not be displayed on the display screen, but may be displayed when a phone call request message is received from an opposite party or the phone call request message is transmitted by the user.

Additionally, in the opposite-party list window 620, a list of all opposite parties previously input by the user or a list of opposite parties viewing the same channel as viewed by the user may be displayed. Here, the channel means a broadcasting content received from a digital broadcasting station. The user may transmit a moving image content separately prepared by the user to an opposite party, or may make a phone call while viewing the moving image content along with the opposite party.

One or a number of opposite party image windows 610 may be displayed on the display unit. The user can select the opposite party image window using the remote controller, and can connect with the opposite party or release the connection to conduct the multilateral communication.

The opposite party list window 620 and the opposite party image windows 610 may be displayed on the display screen by a picture in picture (PIP) technique, and the display positions of the windows may be changed according to the user's preference.

Figure 7:
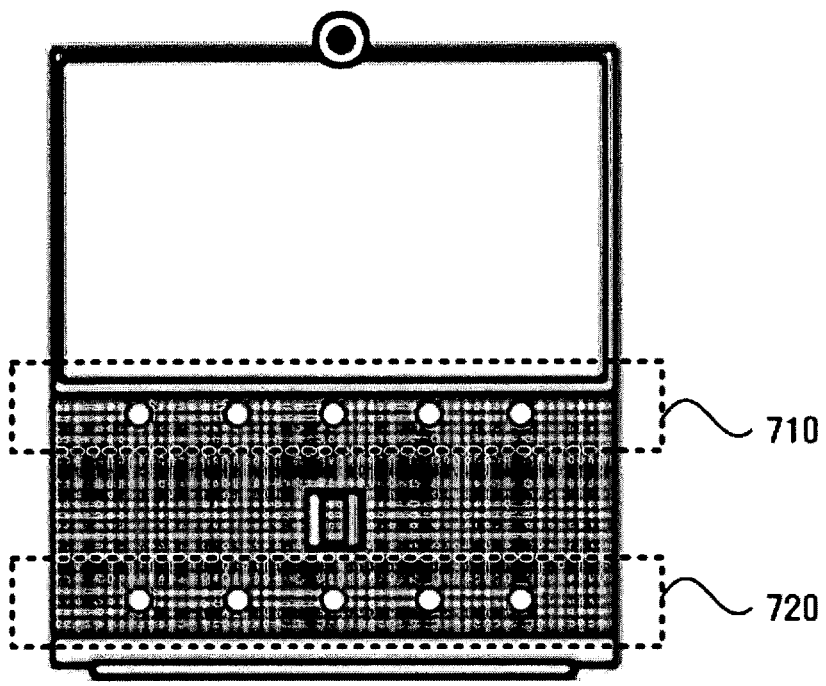
FIG. 7 is a view illustrating an example of an external shape of a broadcast receiving apparatus for providing a multilateral video communication according to an embodiment of the present invention.

FIG. 7 shows a broadcast receiving apparatus provided with a plurality of microphone arrays according to an embodiment of the present invention.

The broadcast receiving apparatus for providing a multilateral video communication according to an embodiment of the present invention may include plural microphone arrays 710 and 720.

When the user's position is determined using one microphone array 710 or 720, only a component of the user's position in a horizontal direction can be detected. By contrast, in the case where a plurality of microphone arrays 710 and 720 are used, components of the user's position in horizontal and vertical directions can be detected.

Figure 8:
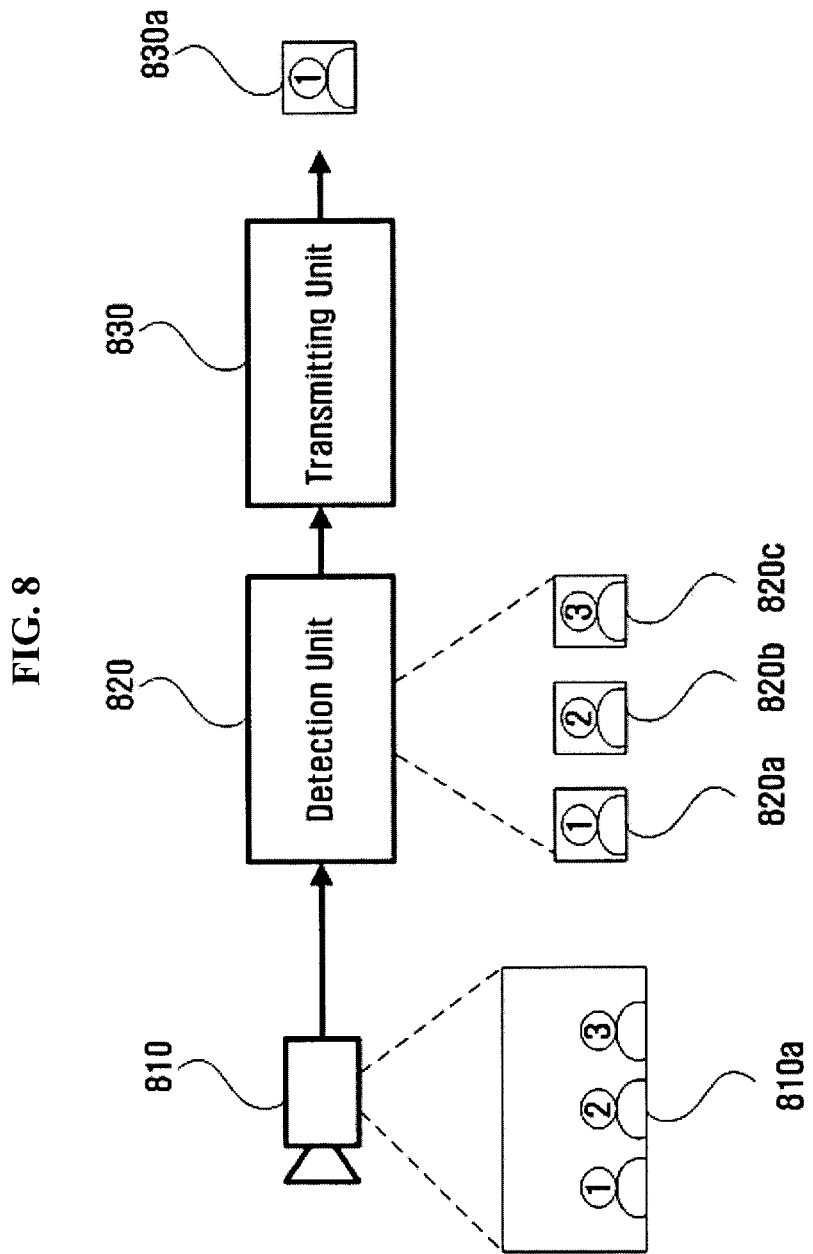
FIG. 8 is a conceptual view explaining the detection of faces of a number of users according to an embodiment of the present invention.

FIG. 8 is a conceptual view explaining the detection of faces of a number of users according to an embodiment of the present invention.

If one user is captured by the camera, the instantaneous position of the user is detected through the microphone array, the user's face or the upper half of the user's body is detected using the above-described face detection algorithm, and then the detected user's face or the upper half of the user's body is enlarged and transmitted.

If a number of users are captured by the camera, the face of any one of the captured users or the face of the user located in the middle of the captured users may be detected.

In this case, if the plural users transmit voice signals in shifts, the faces of the users who have transmitted the voice signals are captured every moment using the camera having additional devices such as zooming, panning and tilting devices. However, if the shift period between the users is short, it is difficult for the additional devices to follow their reaction speeds.

Accordingly, in detecting the faces of a number of users, it is desirable to use a software image enlargement process.

A camera 810 captures the image of users and outputs an image 810a that includes the users to a detection unit 820. The detection unit 820 having received the image 810a detects the faces of the users or the upper halves of the users' bodies 820a, 820b and 820c by analyzing the image 810a as a whole. That is, the detection unit 820 detects the faces from the image continuously received from the camera 810, and transfers only the face of the user or the upper half of the body of the user who has transmitted the voice signal to the transmitting unit 830. Accordingly, the transmitting unit 830 can transmit the face or the upper half 830a of the body of the selected user to the opposite party's terminal.

Specifically, the detection unit 820 detects the faces or the upper halves 820a, 820b and 820c of the bodies of all the users captured by the camera 810 using the instantaneous positions of the users determined by the position determining unit, and transmits only the face or the upper half of the body of the user determined to be the most pertinent among the captured users, to the transmitting unit 830.

In this case, the position of the user's face may be finely adjusted or the face of the user may be changed by manipulating button keys or direction keys of the remote controller. For example, if the position of the user's face transferred to the transmitting unit 830 deviates from the display screen, the face or the upper half of the body of the user that is transmitted to the transmitting unit 830 is corrected using the direction keys of the remote controller. Also, if the face of another user who is not the user having actually transmitted the voice signal is transferred to the transmitting unit 830, the face of the user can be changed using the button keys.

The broadcast receiving apparatus and method for providing a multilateral video communication according to the above-described embodiment of present invention has one or more of the following effects.

First, a user can easily make a phone call with a remotely opposite party during viewing of a digital TV by making it possible to communicate with a number of remotely opposite parties using the digital TV having a camera therein and which supports the Internet.

Second, a user's privacy can be protected by tracking and enlarging the face of the user and transmitting the user's enlarged face image to opposite parties.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A broadcast receiving apparatus for providing a multilateral video communication, comprising:
    a position determining unit determining a position of a user by analyzing a voice signal received through a microphone array;
    a detection unit detecting and identifying a face of the user in the determined position from an image received through a camera; and
    a transmission unit transmitting the identified face of the user and the received voice signal to a terminal through a network,
    wherein the camera captures the image of a plurality of users,
    wherein the detection unit identifies the face of the user among the plurality of users,
    wherein the transmission unit transmits only the identified face of the user or the upper half of the body of the user from among the plurality of users, and wherein a voice signal coming from the determined position is amplified and voice signals coming from in other directions around the determined position are removed, and wherein the detection unit detects the motion of the user when the face of the user is not detected, detects the face of the user when the motion of the user is not detected and determines whether a number of failures within a predetermined time exceeds a threshold value when the detecting the face of the user has failed, and when the number of failures exceeds the threshold value, stops the detecting the face of the user, and performs the detecting the motion of the user.

2. The apparatus as claimed in claim 1, wherein the position determining unit determines the position of the user using time delays of voice signals received by respective microphones of the microphone array and the presence of the user in the position where the voice signal is produced.

3. The apparatus as claimed in claim 1, wherein the camera tracks and detects a face of the user using at least one of functions of zooming, panning and tilting.

4. The apparatus as claimed in claim 3, wherein the detected face of the user is an image signal finely adjusted by performing at least one of functions of zooming, panning and tilting through a remote controller.

5. The apparatus as claimed in claim 1, wherein the transmitting unit transmits the identified face of the user and the received voice signal to an address of a pre-stored opposite party.

6. The apparatus as claimed in claim 1, further comprising a noise removing unit removing noise of the input signal received through the microphone array.

7. The apparatus as claimed in claim 6, wherein the noise removing unit comprises:
   a noise detection unit detecting a noise region that does not have the voice signal from the received input signals;
   a weight value determining unit determining a weight value used to extract the voice signal from the signals existing in the noise region; and
   a voice extraction unit extracting only the voice signal from the input signals using the determined weight value.

8. A broadcast receiving method for providing a multilateral video communication, comprising:
   determining a position of a user by analyzing a voice signal received through a microphone array;
   detecting and identifying a face of the user in the determined position from an image received through a camera; and
   transmitting the identified face of the user and the received voice signal to a terminal through a network,
   wherein the camera captures the image of a plurality of users,
   wherein the identifying comprises identifying the face of the user among the plurality of users,
   wherein the transmitting transmits only the identified face of the user or the upper half of the body of the user from among the plurality of users,
   wherein a voice signal coming from the determined position is amplified and voice signals coming from in other directions around the determined position are removed, and
   wherein the detecting the face of the user includes detecting the motion of the user when the face of the user is not detected, or detecting the face of the user when the motion of the user is not detected and determining whether a number of failures within a predetermined time exceeds a threshold value when the detecting the face of the user has failed, and when the number of failures exceeds the threshold value, stopping the detecting the face of the user, and performing the detecting the motion of the user.

9. The method as claimed in claim 8, wherein the determining the position of the user includes determining the position of the user using time delays of voice signals received by respective microphones of the microphone array and the presence of the user in the position where the voice is generated.

10. The method as claimed in claim 8, wherein the camera tracks and detects a face of the user using at least one of functions of zooming, panning and tilting.

11. The method as claimed in claim 10, wherein the detected face of the user is an image signal finely adjusted by performing at least one of functions of zooming, panning and tilting through a remote controller.

12. The method as claimed in claim 8, wherein the transmitting includes transmitting the identified face of the user and the received voice signal to an address of a pre-stored opposite party.

13. The method as claimed in claim 8, further comprising removing noise of an input signal received through the microphone array.

14. The method as claimed in claim 13, wherein the removing noise comprises:
   detecting a noise region that does not have a voice signal from received input signals;
   determining a weight value used to extract the voice signal from signals existing in the noise region; and
   extracting only the voice signal from the input signals using the determined weight value.

15. A broadcast receiving method for providing a multilateral video communication, comprising:
   determining a position of a user by analyzing a voice signal received through a microphone array;
   detecting a face of the user in the determined position from an image received through a camera; and
   transmitting the detected face of the user and the received voice signal to a terminal through a network,
   wherein the detecting a face comprises:
      comparing an input image frame with the face database and using an M-grid Garbor wavelet transformation to detect a face candidate region;
      detecting a face using a support vector machine (SVM) classification technique; and
      determining whether the face detected by the SVM classification technique includes the face candidate region detected by M-grid Garbor wavelet transformation.

16. A method of communicating using a television having a camera and a microphone array and which supports Internet access, comprising:
   determining a location of a user by analyzing a user voice signal received through the microphone array;
   detecting and identifying a face of the user from an image received by the camera, the camera faced toward the location of the user; and
   transmitting the identified face and the received voice signal to a terminal via the Internet,
   wherein the camera captures the image of a plurality of users,
   wherein the identifying comprises identifying the face of the user among the plurality of users,
   wherein the transmitting transmits only the identified face of the user or the upper half of the body of the user from among the plurality of users, wherein a voice signal coming from the determined location is amplified and voice signals coming from in other directions around the determined position are removed, and wherein the user detection comprises determining whether a present mode is a face detection mode and when the present mode is the face detection mode performing face detection and when the present mode is not the face detection mode performing motion detecting and determining whether a number of failures within a predetermined time exceeds a threshold value when the performing face detection has failed, and when the number of failures exceeds the threshold value, stopping the performing face detection, and performing the motion detecting.

17. A method of communicating using a television having a camera and a microphone array and which supports Internet access, comprising:

determining a location of a user by analyzing a user voice signal received through the microphone array;

detecting a face of the user from an image received by the camera, the camera faced toward the location of the user; and transmitting the detected face and the received voice signal to a terminal via the Internet, wherein the user detection comprises determining whether a present mode is a face detection mode and when the present mode is the face detection mode performing face detection and when the present mode is not the face detection mode performing motion detecting, and wherein the face detection comprises:

determining whether the face detection has succeeded by determining whether a face detected by SVM classification technique includes a face candidate detected by M-grid Garbor wavelet transformation;

determining whether an end signal is received when the face detection has succeeded, ending the face detection when the end signal is received, and repeating face detection when the end signal is not received; and determining whether the number of failures within a predetermined time exceeds a threshold value when the face detection has failed, and when the number of failures exceeds the threshold value, stopping the face detection, and performing motion detection.

18. The method as claimed in claim 16, wherein the motion detection further comprises:

determining whether the motion detection has succeeded;

determining whether the number of successes within the predetermined time exceeds the threshold value, when the motion detection has succeeded, and when the number of successes exceeds to the threshold value, stopping the motion detection, and performing face detection; and determining whether an end signal is received when the motion detection has not succeeded, ending the motion detection when the end signal is received, and repeating the motion detection when the end signal is not received.

* * * * *